United States Patent [19]
Stewart et al.

[11] Patent Number: 5,552,257
[45] Date of Patent: Sep. 3, 1996

[54] THERMAL DECOMPOSITION OF AZIDE-CONTAINING MATERIALS

[75] Inventors: Edward G. Stewart, White Bear Lake; William V. Dower; Michael C. Palazzotto, both of St. Paul; Martin B. Wolk, Woodbury; Anthony P. Manzara, Lake Elmo, all of Minn.

[73] Assignee: Minnesota Mining and Manufacturing Company, St. Paul, Minn.

[21] Appl. No.: 184,281

[22] Filed: Jan. 21, 1994

[51] Int. Cl.$^6$ .................................................. G03C 8/00
[52] U.S. Cl. ......................... 430/201; 428/164; 149/19.2; 149/19.6
[58] Field of Search ................................ 149/19.2, 19.6; 428/164; 430/201; 556/47, 142

[56] References Cited

U.S. PATENT DOCUMENTS

| | | | |
|---|---|---|---|
| 3,645,917 | 2/1972 | Vandenburg | 260/2 A |
| 3,694,383 | 9/1972 | Azami et al. | 260/2 X |
| 4,318,760 | 3/1982 | Stephens et al. | 149/19.2 |
| 4,379,903 | 4/1983 | Reed, Jr. et al. | 528/55 |
| 4,483,978 | 11/1984 | Manser | 528/408 |
| 4,781,861 | 11/1988 | Wilson et al. | 260/349 |
| 4,879,419 | 11/1989 | Johannessen | 568/606 |
| 4,891,438 | 1/1990 | Ahad | 552/11 |
| 4,938,812 | 7/1990 | Flanagan et al. | 149/19.1 |
| 4,970,326 | 11/1990 | Flanagan et al. | 552/12 |
| 5,164,521 | 11/1992 | Manzara et al. | 552/10 |
| 5,191,034 | 3/1993 | Ahad | 525/407 |
| 5,214,110 | 5/1993 | Ahad | 525/403 |
| 5,256,804 | 10/1993 | Ampleman | 552/10 |

FOREIGN PATENT DOCUMENTS 1497531   6/1965   United Kingdom.

OTHER PUBLICATIONS

N. Kubota et al., *Propellants, Explosives, Pyrotechnics*, 12, 183–187 (1987).
Y. Oyumi, *Propellants, Explosives, Pyrotechnics*, 17, 226–231 (1992).
S. Shen et al., *Thermochimica Acta*, 216, 255–266 (1993).
S. Shen et al., *Thermochimica Acta*, 221, 275–282 (1993).
B. F. Hallam and P. L. Pauson, *J. Chem. Soc.*, 1956, 3030–3037.
Aviram et al., *J. Imaging Technology*, 17 (6), pp. 295–298, 1991.
Piper et al., *J. Inorganic and Nuclear Chemistry*, 1955, vol. 1, pp. 165–174.
Peter A. S. Smith, *Molecular Rearrangements*, Paul Demayo, Ed., Interscience, New York, 1963, Part One, pp. 457–591.

*Primary Examiner*—Charles T. Jordan
*Assistant Examiner*—John R. Hardee
*Attorney, Agent, or Firm*—Gary L. Griswold; Walter N. Kirn; Gregory A. Evearitt

[57] ABSTRACT

Various catalyst precursors are used for the thermal decomposition of azide-containing polymers and oligomers. The catalyst precursors are organometallic complexes which upon thermolysis are capable of liberating at least one coordination site, thereby generating a catalyst for the thermal decomposition of the azide-containing polymer or oligomer.

12 Claims, 3 Drawing Sheets

THERMAL DECOMPOSITION OF AZIDE-CONTAINING MATERIALS

FIELD OF THE INVENTION

This invention relates to the thermal decomposition of azide-containing materials and in particular, it relates to such decomposition utilizing a catalyst precursor which is an organometallic complex.

BACKGROUND OF THE ART

It is well established that the thermal decomposition of azides can be catalyzed by certain Lewis or protic acids. For example, ferruginous compounds such as $Fe_2O_3$, ferrocene, 2,2-bis(ethylferrocenyl)propane Catocene™ combustion catalyst, etc., have been studied as catalysts for burning-rate modification of propellants comprising azide-containing polymers such as glycidyl azide polymer ("GAP") and bis(azidomethyl)oxetane polymer ("BAMO"). See, for example, N. Kubota et al., *Propellants, Explosives, Pyrotechnics*, 12, 183–187 (1987); Y. Oyumi, *Propellants, Explosives, Pyrotechnics*, 17, 226–231 (1992); S. Shen et al., *Thermochimica Acta.*, 216, 255–266 (1993); and S. Shen et al., *Thermochimica Acta.*, 221, 275–282 (1993).

Due to the nature of catalysts and their effect on the Arrhenius kinetics of a thermal reaction (such as the pyrolysis of azides), the resulting lowering in the energy of activation of the thermal reaction by the catalyst accelerates the rate of the reaction at all temperatures. Thus, some reactions will occur at lower than desired temperatures. This can cause short shelf lives for some formulations of thermally-decomposable material and catalyst, thereby rendering a given application of the formulation, such as a coating, impractical.

In view of the foregoing, what is needed is a system whereby the acid-catalyzed thermal decomposition of materials, such as azide-containing polymers and oligomers, can be fine-tuned and controlled, thereby extending the shelf lives and broadening the potential applications of azide-containing materials.

SUMMARY OF THE INVENTION

In accordance with the present invention, it has been discovered that the thermal decomposition of azide-containing materials can be efficiently controlled by the use of certain catalyst precursors which are organometallic complexes. Although not wishing to be bound by theory, it is believed that the particular organometallic complexes which are utilized in the present invention are essentially catalytically inactive for the thermal decomposition of azide-containing oligomers and polymers until the organometallic complex is heated at or near its respective decomposition temperature at which time it releases at least one coordination site, thereby generating the catalyst for the thermal decomposition of the azide-containing oligomer or polymer.

Thus, in one embodiment of the present invention there is provided a material comprising:

(a) at least one polymer which contains at least about 25 wt % azide groups: and (b) at least one catalyst precursor which is an organometallic complex which upon thermolysis liberates at least one coordination site, thereby generating a catalyst for the thermal decomposition of the azide-containing polymer, the catalyst precursor having the formula:

$$[L^1L^2L^3M]^{+e}X_f \qquad (I)$$

wherein:

$L^1$ represents none or 1 to 12 ligands contributing pi-electrons that can be the same or different selected from: substituted and unsubstituted acyclic and cyclic unsaturated compounds and groups and substituted and unsubstituted carbocyclic aromatic and heterocyclic aromatic compounds, each contributing 2 to 6 pi-electrons to the valence shell of M;

$L^2$ represents none or 1 to 24 ligands that can be the same or different, contributing an even number of sigma-electrons, selected from: mono-, di-, and tridentate ligands, each donating 2, 4, or 6 sigma-electrons to the valence shell of M;

$L^3$ represents none or 1 to 12 ligands that can be the same or different, each contributing no more than one sigma-electron each to the valence shell of each M;

M represents 1 to 4 of the same or different metal atoms selected from the elements of Periodic Groups IVB, VB, VIB, VIIB, and VIII;

e is an integer having a value of 0, 1, or 2, such that the organometallic portion of the molecule is neutral, cationic, or dicationic;

X is an anion selected from organic sulfonate and halogenated metal or metalloid groups; and f is an integer having a value of 0, 1, or 2, the number of anions required to balance the charge e on the organometallic complex;

with the proviso that: (i) the organometallic complex contains at least one metal-carbon bond; (ii) $L^1$, $L^2$, $L^3$, M, e, X, and f are chosen so as to achieve a stable electronic configuration: and (iii) if M is Fe, e is 0, and $L^1$ is two substituted or unsubstituted cyclopentadienyl ligands, then one of $L^2$ or $L^3$ must be present.

Preferably, the polymer contains at least about 35 wt % azide groups and more preferably, at least about 40 wt % azide groups based upon the weight of the polymer. Preferably, the azide-containing polymer is present in the inventive material in the range of from about 5 to 99.9 wt % based upon the total weight of the inventive material comprising the azide-containing polymer. The specific amount of azide-containing polymer used will depend upon the properties desired for the specific application.

The azide-containing polymer is preferably glycidyl azide polymer ("GAP"); bis(azidomethyl)oxetane ("BAMO"); or is a block or random copolymer unit derived from at least two different monomers, at least one of the monomers containing at least one azide group.

Preferably, the catalyst precursor is present in the inventive material in the range of from about 0.1 to 40 wt %, and more preferably, from about 1 to 10 wt %, based upon the total weight of the inventive material comprising the azide-containing polymer.

In another embodiment, the present invention provides a material comprising:

(a) an oligomer which comprises from about 2 to 20 monomeric units, each of the monomeric units comprising at least one azide group;

(b) a polymer which has a thermally available nitrogen content of less than about 5 wt % and which is soluble in the oligomer; and (c) at least one catalyst precursor which is an organometallic complex which upon thermolysis is capable of liberating at least one coordination site, thereby generating a catalyst for the thermal decomposition of the oligomer, the catalyst precursor having the formula (I) as disclosed earlier herein.

Preferably, the oligomer is end-capped with an ester, an ether, or a hydroxyl group; has a molecular weight in the range of about 150 to 2500; and is present in the inventive mixture in the range of from about 40–95 wt % and more preferably, from about 50–75 wt %, based upon the total weight of the inventive material comprising the oligomer.

The non-energetic polymer has a thermally available nitrogen content of less than about 5 wt % and is soluble in the energetic oligomer. As used herein "soluble in the energetic oligomer" means the polymer and oligomer are miscible in the temperature range of interest for formulation, coating, storage, and use. Additionally, it is preferred that the non-energetic polymer is a polyether or a polyester and is present in the inventive material in the range of from about 5–60 wt % and more preferably, from about 25–50 wt %, based upon the total weight of the inventive material.

Preferably, the catalyst precursor is present in the inventive material comprising the oligomer in the range of from about 0.1 to 40 wt %, and more preferably, from about 1 to 10 wt %, based upon the total weight of the inventive material.

As used herein:

"azide" refers to $N_3$;

"group" refers to not only pure hydrocarbon chains or structures such as methyl, ethyl, cyclohexyl, and the like, but also to chains or structures bearing conventional substituents in the art such as hydroxyl, alkoxy, phenyl, halo (F, Cl, Br, I), cyano, nitro, amino, etc.;

"radical" refers to the inclusion of only pure hydrocarbon chains such as methyl, ethyl, propyl, cyclohexyl, isooctyl, tert-butyl, and the like;

"thermally available nitrogen content" refers to the nitrogen content (weight percentage basis) of a material which upon exposure to heat (preferably less than about 300° C. and more preferably less than about 250° C.) generates or liberates nitrogen ($N_2$) gas; and "stable electronic configuration" means that there are restrictions on the sum of electrons donated by the ligands, $L^1$, $L^2$, $L^3$ of formula I and the valence electrons possessed by the metal. For most organometallic compounds not involving intramolecular metal-metal bonding, this sum is governed by the "eighteen electron rule" [see *J. Chem. Ed.*, 46, 811 (1969)]. This rule is sometimes called the "nine orbital rule", "the effective member rule", or the "rare gas rule". This rule states that the most stable electronic configurations for organometallic compounds tend to be those in which the sum of the electrons donated by the ligands and the metal is eighteen.

Those skilled in the art, however, know that there are exceptions to this rule and that organometallic compounds having a sum of 16, 17, 19, and 20 electrons are also known. Therefore, organometallic compounds not including intramolecular metal-metal bonding as described by formula I, in which complexed metals having a total sum of 16, 17, 18, 19, or 20 electrons in the valence shell, are included within the scope of the invention.

For compounds described in formula I in which intramolecular metal-metal bonding exists, serious departure from the "eighteen electron rule" can occur. It has been proposed [*J. Amer. Chem. Soc.* 100, 5305 (1978)] that the departure from the "eighteen electron rule" in these transition metal compounds is due to the metal-metal interactions destabilizing the metal p orbitals to an extent to cause them to be unavailable for ligand bonding. Hence, rather than count electrons around each metal separately in a metal cluster, cluster valence electrons (CVE) are counted. A dinuclear compound is seen to have 34 CVE's, a trinuclear compound 48 CVEs, and a tetranuclear compound having tetrahedron, butterfly, and square planar geometry is seen to have 60, 62, or 64 CVE's, respectively. Those skilled in the art, however, know that there are exceptions to this electron counting method and that organometallic cluster compounds having a sum of 42, 44, 46, 50 CVE's for a trinuclear compound and 58 CVE's for a tetranuclear compound are also known. Therefore, di, tri, or tetranuclear organometallic compounds are described by formula I in which the complexed metal cluster, MM, MMM, or MMMM has a sum of 34; 42, 44, 46, 48, 50; 58, 60, 62, or 64 CVE's in the valence shell, respectively, and are included within the scope of this invention.

Other aspects, advantages, and benefits of the present invention are apparent from the detailed description, the examples, and the claims.

DETAILED DESCRIPTION OF THE INVENTION

Energetic Polymer

The energetic polymer(s) utilized in the present invention is at least one which contains at least about 25 wt %; preferably, at least about 35 wt %; and more preferably, at least about 40 wt % azide groups.

In one preferred embodiment, the azide-containing polymer used as one of the reactants has the following formula:

(II)

wherein:

Y represents a hydroxyl, azide, carboxyl, mercapto, or amino (including mono-alkyl and aryl-substituted amino) group and preferably, Y is an azide or a hydroxyl group;

R represents a divalent monomer group, containing a $N_3$ group, derived from a cyclic ether such as, for example, —$CH_2CH(CH_2N_3)O$—, —$CH_2C(CH_3)(CH_2N_3)CH_2O$—, —$CH(CH_2N_3)CH_2O$—, —$CH_2C(CH_2N_3)_2CH_2O$—, —$CH_2CH(N_3)CH(CH_2N_3)O$— and —$CH_2CH(N_3)CH_2O$—; a cyclic sulfide such as, for example, —$CH_2CH(CH_2N_3)S$—, —$CH_2C(CH_2N_3)_2CH_2S$—, —$CH(CH_2N_3)CH(CH_2N_3)S$, and —$CH_2CH(N_3)CH_2S$—; and a cyclic amine such as, for example, —$CH_2CH(CH_2N_3)NR^1$—, —$CH(CH_2N_3)CH_2NR^1$—, —$CH_2$ C(CH$_2$N$_3$)$_2$CH$_2$NR$^1$—,
—CH(CH$_2$N$_3$)CH(CH$_2$N$_3$)NR$^1$—, and
—CH$_2$CH(N$_3$)CH$_2$NR$^1$—;

R$^1$ represents a hydrocarbyl group (e.g., alkyl, cycloalkyl, aryl, aralkyl, alkaryl, etc.);

L represents a mono-, di-, tri- or tetra-valent alkyl radical. Non-limiting examples of monovalent radicals are methyl and ethyl. Non-limiting examples of polyvalent alkyl radicals are ethylene, methylene, propylene, 1,2,3-propanetriyl, 2-ethyl-2-methylene-1,3-propanediyl, 2,2-dimethylene-1,3-propanediyl, etc. Preferably, L is 2-ethyl-2-methylene-1,3-propanediyl;

corresponding to L, m represents 1, 2, 3, or 4; and n represents any positive integer greater than 1; preferably, greater than 5; and more preferably, greater than 10.

The foregoing azide-containing polymer of Formula (II) can be made by procedures well known to those skilled in the art of synthetic organic chemistry such as disclosed, for example, in U.S. Pat. Nos. 3,645,917 and 4,879,419, the disclosures of which are incorporated herein by reference.

One or more crosslinking agents may be employed in combination with the azide-containing polymer of Formula (II) to provide coatings having improved strength. The choice of an appropriate crosslinking agent depends on the functional groups on the azide-containing polymer. Thus, if hydroxyl groups are present on the azide-containing polymer, then crosslinking agents for polyols could be employed (e.g., isocyanates). In cases where free-radically polymerizable groups, such as acrylates, are attached to the polymer backbone, a free-radical initiator may be used as a crosslinking agent.

Preferably, a crosslinking agent for polyols is employed in combination with an azide-containing polymer having multiple hydroxyl end groups. Preferred crosslinking agents in this case are polyisocyanates, including but not limited to, hexamethylene diisocyanate; diphenylmethane diisocyanate; bis(4-isocyanatocyclohexyl)methane, 2,4-toluene diisocyanate, etc.

In another preferred embodiment, the azide-containing polymer used as one of the reactants is a glycidyl azide polymer having recurring units of the following formula:

$$-CH_2-\underset{\underset{R^2}{|}}{CH}-O- \qquad (III)$$

wherein:

R$^2$ represents an N$_3$-containing group. An example of a preferred azide group is —CH$_2$N$_3$.

The azide-containing polymer of Formula (III) can be made by procedures well known to those skilled in the art of synthetic organic chemistry such as disclosed, for example, in U.S. Pat. Nos. 4,891,438, 5,191,034, 5,214,110, 5,164,521, and 5,256,804, the disclosures of which are incorporated herein by reference.

In another preferred embodiment, the azide-containing polymer used as one of the reactants is a polymer having recurring units of the following formula:

$$-CH_2-\underset{\underset{R^4}{|}}{\overset{\overset{R^3}{|}}{C}}-CH_2-O- \qquad (IV)$$

wherein:

either R$^3$ or R$^4$ or both each independently represent an N$_3$-containing group. An example of a preferred azide group is —CH$_2$N$_3$.

The azide-containing polymer of Formula (IV) can be made by procedures well known to those skilled in the art of synthetic organic chemistry such as disclosed, for example, in U.S. Pat. No. 3,694,383, the disclosure of which is incorporated herein by reference.

In another preferred embodiment, energetic copolymers are utilized as reactants having repeating units derived from different monomers, one or more of which have N$_3$ groups. Preferably, the monomers are cyclic oxides having three to six ring atoms. Copolymerization of the monomers is preferably carried out by cationic polymerization. The foregoing copolymers and their method of preparation are disclosed in U.S. Pat. No. 4,483,978, the disclosure of which is incorporated herein by reference.

Depending upon the initial loading of the azide content of the starting polymer, some of the azide groups of the polymer can undergo a derivatization reaction with dipolarophiles which have reactive groups or centers selected from olefins and alkynes. The reactive groups of the dipolarophile are substituted with electron withdrawing groups as is known in the art. As a result of the reaction of the dipolarophile with some of the azide groups of the polymer, triazole or triazoline groups are formed depending upon the dipolarophile and considerations of regiospecificity.

The reaction between an azide group of a polymer and an olefin or alkyne reactive group of a dipolarophile may be illustrated by the following synthetic schemes:

Z and Z' may be independently represented by the following non-inclusive list: R$^5$, CO$_2$R$^5$, COR$^5$, NO$_2$, CF(NO$_2$)$_2$, CN, SOR$^5$, SO$_2$R$^5$, SO$_3$R$^5$, where R$^5$ is H, halogen, alkyl, aryl, substituted-alkyl, substituted-aryl, perfluoroalkyl, or substituted-perfluoroalkyl.

Generally, the foregoing derivatization reactions occur under extremely mild conditions in a "one-pot" reaction. A solution of the azide-containing polymer and the dipolarophile in an appropriate solvent (such as MEK) is heated in a closed container at about 60° C. for about 1–24 hours. Enough of the dipolarophile is added to react with a portion of the azide groups in the polymer, resulting in an energetic polymer containing at least 25 wt % unreacted azide groups. The amount of dipolarophile to be added can usually be determined by ordinary stoichiometric calculations. The reaction occurs during heating and the resulting solution can be used directly for coating after it has been cooled to room temperature or the material can be concentrated and the solvent changed to another which is more preferable.

If water solubility of the resulting polymer product is desired, then the reactive groups of the dipolarophile should be substituted with water-solubilizing groups such as carboxylates or groups which are easily transformed into water solubilizing groups.

Water solubility of the azide-containing polymeric reaction product is desirable for several reasons. First, aqueous coating solutions are highly preferred in the manufacture of films because of environmental, safety, and handling considerations. Second, an increase in the number of certain substituents, such as an ammonium carboxylates, on the azide-containing polymer can improve the polymer's thermal properties. Third, the polymers can be used in combination with materials which can only be dissolved in aqueous media (e.g., catalysts, oxidizers, sensitizers, etc.).

Energetic Oligomers

The energetic oligomers used in the present invention comprise from about 2 to 20 monomeric units, each of the monomeric units comprising at least one azide group. Preferably, the oligomer is end-capped with an ester, an ether, or a hydroxyl group; has a molecular weight in the range of from about 150 to 2500; and is present in the inventive material in the range of from about 40 to 95 wt %, and more preferably, from about 50 to 75 wt %, based upon the total weight of the mixture comprising the energetic oligomers.

The preferred energetic oligomers for use in this invention are composed of monomer units (V), for BAMO, and (VI), for GAP.

The energetic oligomers of Formulae V and VI can be made by procedures well known to those skilled in the art of synthetic organic chemistry such as disclosed, for example, in U.S. Pat. Nos. 4,781,861, 4,938,812, and 4,970,326, the disclosures of which are incorporated herein by reference.

The energetic oligomers used in this invention may be combined with other materials including binders, pigments, oxidants, fuels, plasticizers, crosslinkers, dyes, etc. to impart a particular set of properties as desired.

The Catalyst Precursor(s)

The catalyst precursor(s) used in the present invention has (have) the following formula:

wherein:

$L^1$ represents none or 1 to 12 ligands contributing pi-electrons that can be the same or different selected from: substituted and unsubstituted acyclic and cyclic unsaturated compounds and groups and substituted and unsubstituted carbocyclic aromatic and heterocyclic aromatic compounds, each contributing 2 to 6 pi-electrons to the valence shell of M;

$L^2$ represents none or 1 to 24 ligands that can be the same or different contributing an even number of sigma-electrons selected from: mono-, di-, and tri-dentate ligands, each donating 2, 4, or 6 sigma-electrons to the valence shell of M;

$L^3$ represents none or 1 to 12 ligands that can be the same or different, each contributing no more than one sigma-electron each to the valence shell of each M;

M represents 1 to 4 of the same or different metal atoms selected from the elements of Periodic Groups IVB, VB, VIB, VIIB, and VIII (commonly referred to as transition metals);

e is an integer having a value of 0, 1, or 2, such that the organometallic complex is neutral, cationic, or dicationic;

X is an anion selected from organic sulfonate and halogenated metal or metalloid groups:

f is an integer of 0, 1, or 2, the number of anions required to balance the charge e on the organometallic complex; with the proviso that: (i) the organometallic complex contains at least one metal-carbon bond; (ii) $L^1$, $L^2$, $L^3$, M, e, X, and f are chosen so as to achieve a stable electronic configuration: and (iii) if M is Fe, e is 0 and $L^1$ is two substituted or unsubstituted cyclopentadienyl ligands, then one of $L^2$ or $L^3$ must be present.

Ligands $L^1$ to $L^3$ are well known in the art of transition metal organometallic compounds. At least one such ligand must be present in the catalyst precursor of the present invention. Any of the $L^1$ or $L^2$ or $L^3$ ligands may be present as a pendant group on a polymer.

Ligand $L^1$ of general formula (I) is provided by any monomeric or polymeric compound having an accessible unsaturated group, i.e., an ethylenic, —C═C— group; acetylenic, —C≡C— group; or aromatic group which has accessible pi-electrons regardless of the total molecular weight of the compound. By "accessible", it is meant that the compound (or precursor compound from which the accessible compound is prepared) bearing the unsaturated group is soluble or swellable in a reaction medium, such as an alcohol, e.g., methanol; a ketone, e.g., methyl ethyl ketone; an ester, e.g., amyl acetate; a halocarbon, e.g., trichloroethylene; an alkane, e.g., decalin; an aromatic hydrocarbon, e.g., anisole; an ether, e.g., tetrahydrofuran; etc, or that the compound is divisible into very fine particles of high surface area so that the unsaturated group (including aromatic group) is sufficiently close to a metal atom to form a pi-bond between that unsaturated group and the metal atom.

Illustrative of ligand $L^1$ are the linear and cyclic ethylenic and acetylenic compounds having less than 100 carbon atoms (when monomeric), preferably having less than 60 carbon atoms, and from zero to 10 hetero atoms selected from nitrogen, sulfur, non-peroxidic oxygen, phosphorous, arsenic, selenium, boron, antimony, tellurium, silicon, germanium, and tin, the ligands being those such as, for example, ethylene, acetylene, propylene, methylacetylene, alpha-butene, 2-butene, diacetylene, butadiene, 1,2-dimethylacetylene, cyclobutene, pentene, cyclopentene, hexene, cyclohexene, 1,3-cyclohexadiene, cyclopentadiene, 1,4-cyclohexadiene, cycloheptene, 1-octene, 4-octene, 3,4-dimethyl-3-hexene, and 1-decene; eta$^3$-allyl, eta$^3$-pentenyl, norbornadiene, eta$^5$-cyclohexadienyl, cycloheptatriene, cyclooctatetraene, and substituted and unsubstituted carbocyclic and heterocyclic aromatic ligands having up to 25 rings and up to 100 carbon atoms and up to 10 hetero atoms selected from nitrogen, sulfur, non-peroxidic oxygen, phosphorus, arsenic, selenium, boron, antimony, tellurium, silicon, germanium, and tin, such as, for example, eta$^5$-cyclopentadienyl, benzene, mesitylene, hexamethylbenzene, fluorene, naphthalene, anthracene, chrysene, pyrene, eta$^7$-cycloheptatrienyl, triphenylmethane, paracyclophane, 1,4-diphenylbutane, eta$^5$-pyrrole, eta$^5$-thiophene, eta$^5$-furan, pyridine, gamma-picoline, quinaldine, benzopyran, thiochrome, benzoxazine, indole, acridine, carbazole, triphenylene, silabenzene, arsabenzene, stibabenzene, 2,4,6-triphenylphosphabenzene, eta$^5$-selenophene, dibenzostannepine, eta$^5$-tellurophene, phenothiarsine, selenanthrene, phenoxaphosphine, phenarsazine, phenatellurazine, eta$^5$-methylcyclopentadienyl, eta$^5$-pentamethylcyclopentadienyl, and 1-phenylborabenzene. Other suitable aromatic compounds can be found by consulting any of many chemical handbooks.

As mentioned before, the ligand can be a unit of a polymer, for example, the phenyl group in polystyrene, poly(styrene-co-butadiene), poly(styrene-co-methyl methacrylate), poly(alpha-methylstyrene), polyvinylcarbazole, and polymethylphenylsiloxane; the cyclopentadiene group in poly(vinylcyclopentadiene); the pyridine group in poly-(vinylpyridine), etc. Polymers having a weight average molecular weight up to 1,000,000 or more can be used. It is preferable that 1 to 50 percent of the unsaturated or aromatic groups present in the polymer be complexed with organometallic groups.

Each ligand $L^1$ can be substituted by groups that do not interfere with the complexing of the ligand with the metal atom or which do not reduce the solubility of the ligand to the extent that complexing with the metal atom does not take place. Examples of substituting groups, all of which preferably have less than 30 carbon atoms and up to 10 hetero atoms selected from nitrogen, sulfur, non-peroxidic oxygen, phosphorus, arsenic, selenium, antimony, tellurium, silicon, germanium, tin, and boron, include hydrocarbyl groups such as methyl, ethyl, butyl, dodecyl, tetracosanyl, phenyl, benzyl, allyl, benzylidene, ethenyl, and ethynyl; hydrocarbyloxy groups such as methoxy, butoxy, and phenoxy; hydrocarbylmercapto groups such as methylmercapto (thiomethoxy), phenylmercapto (thiophenoxy); hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, benzoxy, and cyclohexanecarbonyloxy; hydrocarbylcarbonamido, e.g., acetamido, benzamido; azo, boryl; halo, e.g., chloro, iodo, bromo, and fluoro; hydroxy; cyano; nitro; nitroso, oxo; dimethylamino; diphenylphosphino, diphenylarsino; diphenylstibine; trimethylgermyl; tributylstannyl; methylseleno; ethyltelluro; and trimethylsiloxy; condensed rings such as benzo, cyclopenta; naphtho, indeno; and the like.

Each ligand $L^2$ in formula (I) is provided by monodentate and polydentate compounds preferably containing up to about 30 carbon atoms and up to 10 hetero atoms selected from nitrogen, sulfur, non-peroxidic oxygen, phosphorus, arsenic, selenium, antimony, and tellurium, where upon addition to the metal atom, following loss of zero, one, or two hydrogens, the polydentate compounds preferably forming with the metal, M, a 4-, 5-, or 6-membered saturated or unsaturated ring. Examples of suitable monodentate compounds or groups are carbon monoxide, carbon sulfide, carbon selenide, carbon telluride, alcohols such as ethanol, butanol, and phenol; nitrosonium (i.e., $NO^+$); compounds of Group VA elements such as ammonia, phosphine, trimethylamine, trimethylphosphine, triphenylamine, triphenylphosphine, triphenylarsine, triphenylstibine, tributylphosphite; nitriles such as acetonitrile, benzonitrile; isonitriles such as phenylisonitrile, butylisonitrile; carbene groups such as ethoxymethylcarbene, dithiomethoxycarbene; alkylidenes such as methylidene, ethylidene; suitable polydentate compounds or groups include 1,2-bis(diphenylphosphino)ethane, 1,2-bis(diphenylarsino)ethane, bis(diphenylphosphino)methane, ethylenediamine, propylenediamine, diethylenetriamine, 1,3-diisocyanopropane, and hydridotripyrazolylborate; the hydroxycarboxylic acids such as glycolic acid, lactic acid, salicylic acid; polyhydric phenols such as catechol and 2,2'-dihydroxybiphenyl; hydroxyamines such as ethanolamine, propanolamine, and 2-aminophenol; dithiocarbamates such as diethyldithiocarbamate, dibenzyldithiocarbamate; xanthates such as ethyl xanthate, phenyl xanthate; the dithiolenes such as bis(perfluoromethyl)-1,2-dithiolene; aminocarboxylic acids such as alanine, glycine and o-aminobenzoic acid; dicarboxylic diamines as oxalamide, biuret; diketones such as 2,4-pentanedione; hydroxyketones such as 2-hydroxyacetophenone; alphahydroxyoximes such as salicylaldoxime; ketoximes such as benzil oxime; and glyoximes such as dimethylglyoxime.

Other suitable groups are the inorganic groups such as, for example, $CN^-$, $SCN^-$, $F^-$, $OH^-$, $Cl^-$, $Br^-$, $I^-$, and $H^-$ and the organic groups such as, for example, acetoxy, formyloxy, benzoyloxy, etc. As mentioned before, the ligand can be a unit of a polymer, for example the amino group in poly(ethyleneamine); the phosphino group in poly(4-vinylphenyldiphenylphosphine); the carboxylic acid group in poly-(acrylic acid); and the isonitriles group in poly(4-vinylphenylisonitrile).

Suitable ligands $L^3$ in formula (I) include any group having in its structure an atom with an unshared electron. Suitable groups can contain any number of carbon atoms and hetero atoms, but preferably contain less than 30 carbon atoms and up to 10 hetero atoms selected from nitrogen, sulfur, oxygen, phosphorus, arsenic, selenium, antimony, tellurium, silicon, germanium, tin, and boron. Examples of such groups are hydrocarbyl groups such as methyl, ethyl, propyl, hexyl, dodecyl, phenyl, tolyl, etc.; unsaturated hydrocarbyl groups such as vinyl, $eta^1$-allyl, $eta^1$-butenyl, $eta^1$-cyclohexenyl; the hydrocarbyl derivatives of a Group IVA element such as trimethylgermanyl, triphenylstannyl, trimethylsilyl, etc.; and organic groups such as formyl, acetyl, propionyl, acryloyl, octadecanoyl, benzoyl, toluenesulfonyl, oxalyl, malonyl, o-phthaloyl.

Also suitable as $L^3$ is any group having in its structure two, three, or four unshared electrons. Examples of such groups are $CH_2$, $CHCH_3$, $SiMe_2$, $SiPh_2$ (wherein Ph is phenyl), $SnPh_2$, $GePh_2$, CH, SiMe, SiPh, SnPh, C, Si, and Sn.

M can be any element from the Periodic Groups IVB, VB, VIB, VIIB, and VIIIB, such as, for example, Ti, Zr, Hf, V, Nb, Ta, Cr, Mo, W, Mn, Tc, Re, Fe, Ru, Os, Co, Rh, Ir, Ni, Pd and Pt.

Each X is provided by organic sulfonates, or halogenated metals or metalloids. Examples of such ions are $CH_3SO_3^-$, $CF_3SO_3^-$, $C_6H_5SO_3^-$, p-toluenesulfonate, p-chlorobenzenesulfonate and related isomers and the like, and those in which X has the formula $DZ_r$, wherein D is a metal from Groups IB to VIIIB or a metal or metalloid from Groups IIIA to VA of the Periodic Chart of Elements, Z is a halogen atom or hydroxyl group, and r is an integer having a value of 1 to 6. Preferably, the metals are copper, zinc, titanium, vanadium, chromium, manganese, iron, cobalt, or nickel and the metalloids preferably are boron, aluminum, antimony, tin, arsenic, and phosphorus. Preferably, the halogen, Z, is chlorine or fluorine.

Illustrative of suitable anions are $BF_4^-$, $PF_6^-$, $AsF_6^-$, $SbF_6^-$, $FeCl_4^-$, $SnCl_5^-$, $SbF_5^-$, $AlF_6^-$, $GaCl_4^-$, $InF_4^-$, $TiF_6^-$, etc. Preferably, the anions are $CF_3SO_3^-$, $BF_4^-$, $PF_6^-$, $SbF_6^-$, $SbF_5OH^-$, $AsF_6^-$, and $SbCl_6^-$.

Covalently bonded organometallic compounds useful in the present invention are available from Strem Chemical Company (Newburyport, Mass.) or can be prepared by literature methods known to those skilled in the art, see for example *Inorg. Chem.* 17, 1003 (1978), *Chem. Ber.* 102, 2449 (1969), *J. Organormet. Chem.* 135, 373 (1977), and *Inorg. Chem.* 18, 553 (1979). Organometallic complexes useful in the present invention can be prepared as disclosed in U.S. Pat. No. 5,191,101.

Illustrative examples of organometallic compounds according to formula (I) include metal carbonyls such as Cr(CO)$_6$, Mo(CO)$_6$, W(CO)$_6$, Fe(CO)$_5$, Fe$_2$(CO)$_9$; CpFe(CO)$_2$Cl; metal-metal bonded binuclear compounds such as [CpFe(CO)$_2$]$_2$, Mn$_2$(CO)$_{10}$, [CpMo(CO)$_3$]$_2$, [CpW(CO)$_3$]$_2$, Re$_2$(CO)$_{10}$, CO$_2$(CO)$_8$, Cp(CO)$_3$W—Mo(CO)$_3$Cp, Cp(CO)$_3$Mo—Mn(CO)$_5$, Cp(CO)$_3$Mo—Re(CO)$_5$, (CO)$_5$Mn—Fe(CO)$_2$Cp, Cp(CO)$_3$W—Mn(CO)$_5$, Cp(CO)$_3$W—Re(CO)$_5$, Cp(CO)$_3$Mo—Co(CO)$_4$, Cp(CO)$_3$W—Co(CO)$_4$, Cp(CO)$_3$Mo—Fe(CO)$_2$Cp, Cp(CO)$_3$W—Fe(CO)$_2$Cp, [CpMo(CO)$_2$PPh$_3$]$_2$, Mn$_2$(CO)$_9$PPh$_3$, Mn$_2$(CO)$_8$(PPh$_3$)$_2$, (CO)$_5$Mn—Re(CO)$_5$, Mn$_2$(CO)$_8$(1,10-phenanthroline), Re$_2$(CO)$_8$(1,10-phenanthroline), R$_2$(CO)$_8$(2,2'-biquinoline), [CpNi(CO)]$_2$, [Cp*Fe(CO)$_2$]$_2$, Cp(CO)$_2$Fe—Fe(CO)(PPh$_3$)Cp, Cp(CO)$_3$Mo—Mo(CO)$_2$(PPh$_3$)Cp; metal clusters such as Co$_4$(CO)$_{12}$, Fe$_3$(CO)$_{12}$, Ru$_3$(CO)$_{12}$, Os$_3$(CO)$_{12}$, Ru$_3$(CO)$_{11}$PPh$_3$, Ru$_3$(CO)$_{10}$(Ph$_2$P—CH$_2$CH$_2$—PPh$_2$), Fe$_2$Ru(CO)$_{12}$, Ir$_4$(CO)$_{12}$; compounds containing a metal-Group IVA bond such as CpFe(CO)$_2$SnPh$_3$, CpFe(CO)$_2$GePh$_3$, [CpFe(CO)$_2$]$_2$SnPh$_2$, CpMo(CO)$_3$SnPh$_3$, (CO)$_5$MnSnPh$_3$, [(CO)$_5$Mn]$_2$SnPh$_2$, CpFe(CO)$_2$PbPh$_3$, CpFe(CO)$_2$CH$_2$Ph, CpFe(CO)$_2$(COPh), CpFe(CO)$_2$(SiPh$_3$), (CO)$_5$MnPbPh$_3$, (CO)$_5$ReSnPh$_3$, CpPtMe$_3$, (MeCp)PtMe$_3$, (Me$_3$SiCp)PtMe$_3$, CpW(CO)$_3$Me, [CpFe(CO)$_2$]$_4$Si; salts of organometallic complex cations such as Cp(CO)$_3$Fe(1+)PF$_6$(1−), Cp(CO)$_2$(CS)Fe(1+)BF$_4$(1−), Cp(CO)(Ph$_3$Sb)$_2$Fe(1+)PF$_6$(1−), Cp(CO)$_3$Ru(1+)FeCl$_4$(1−), Cp(CO)$_2$(Ph$_3$Sb)Fe(1+)SbF$_6$(1−), (MeCp)(CO)$_2$Mn(1+)SbF$_6$(1−), (MeCp)(eta$^3$-allyl)(CO)$_2$Mn(1+)BF$_4$(1−), Cp(CO)$_4$Mo(1+)PF$_6$(1−), (eta$^5$-pentadienyl)(CO)$_3$Fe(1+)BF$_4$(1−), (eta$^5$-cyclohexadienyl)(CO)$_3$Fe(1+)AsF$_6$(1−), (eta$^5$-cyclohexadienyl)(ethylidene)(CO)(Ph$_3$P)Fe(1+)BF$_4$(1−), Cp(ethoxymethylcarbene)(CO)(Ph$_3$P)Fe(1+)BF$_4$(1−), Cp(dithiomethoxycarbene)(CO)$_2$Fe(1+)PF$_6$(1−), Cp(CO)$_2$(methylisonitrile)Fe(1+)AsF$_6$(1−), (eta$^6$-toluene)(CO)$_3$Mn(1+)SbF$_6$ (1−), (eta$^6$-mesitylene)(CO)$_3$Re(1+)SbF$_6$(1−), (eta$^7$-cycloheptatrienyl)(CO)$_3$Cr(1+)PF$_6$(1−), (eta$^7$-cycloheptatrienyl)(CO)$_3$W(1+)AsF$_6$(1−), Cp(eta$^2$-1-pentene)(CO)$_2$ Fe(1+)BF$_4$(1−), (eta$^6$-benzene)CpFe(1+)PF$_6$(1−), (eta$^6$-mesitylene)CpFe(1+)BF$_4$(1−), (eta$^6$-naphthalene)CpFe(1+)SbF$_6$(1−), (eta$^6$-acetophenone)(MeCp)Fe(1+)AsF$_6$(1−), Cp$_2$Co(1+)PF$_6$(1−), Cp$_2$Fe(1+)SbF$_6$(1−), bis(eta$^5$-chlorocyclopentadienyl)Ni(1+)PF$_6$(1−), bis(eta$^6$-benzene)Cr(1+)SbF$_6$(1−), (CO)$_4$(Ph$_3$P)Co(1+)PF$_6$(1−), (CO)$_3$(Ph$_3$P)$_2$Ir(1+)PF$_6$(1−), (eta$^3$-allyl)(CO)$_5$Cr(1+)BF$_4$(1−), (CO)$_5$(NO)Mo(1+)PF$_6$(1−), (eta$^3$-allyl)(CO)$_4$Fe(1+)SbF$_6$(1−), (CO)$_6$Re(1+)SbF$_6$(1−), bis(eta$^6$-hexamethylbenzene)Mn(1+)BF$_4$(1−), bis(eta$^6$-mesitylene)vanadium(1+)PF$_6$(1−), (eta$^7$-cycloheptatrienyl)CpMn(1+)AsF$_6$(1−), (eta$^8$-cyclooctatetraenyl)CpCr(1+)PF$_6$(1−), (eta$^6$-fluorene)CpFe(1+)PF$_6$(1−), (eta$^6$-1-phenylborabenzene)CpCo(1+)PF$_6$(1−), Cp(eta$^5$-N-methylpyrrolyl)Fe(1+)PF$_6$(1−), (eta$^6$-2,3,4,5-tetrathiomethoxybenzene)CpFe(1+)AsF$_6$(1−), [(eta$^6$-1,2,3,3a, 13b, 13a)benzo(10,11)chrysene(2,3-d)(1,3)dioxide](MeCp)Fe(1+)PF$_6$(1−), bis(eta$^5$-acetylcyclopentadienyl)Fe(1+)BF$_4$(1−), (eta$^3$-1-methylallyl)(CO)$_4$Fe(+1)PF$_6$(1−), (eta$^3$-1,3-dimethylallyl)(CO)$_4$Fe(+1)SbCl$_6$(1−); salts of organometallic complex dications such as bis(eta$^6$-hexamethylbenzene)Co(2+)[AsF$_6$(1−)]$_2$, bis(eta$^6$-mesitylene)Fe(2+)[SbF$_6$(1−)]$_2$, bis(eta$^6$-hexamethylbenzene)Ni(2+)[SbF$_6$(1−)]$_2$, bis(eta$^6$-hexamethylbenzene)Fe(2+)[PF$_6$(1−)]$_2$, [(eta$^6$-1,2,3,4,5,6)(eta$^6$-7,8,9,10,11,12)biphenyl]Cp$_2$Fe$_2$(2+)[BF$_4$ (1−)]$_2$, [(eta$^6$-1,2,3,4,4a,9a)(eta$^6$-5,6,7,8, 8a,5a)fluorene]Cp$_2$Fe$_2$(2+)[PF$_6$(1−)]$_2$, [(eta$^6$-1,2,3,4,4a, 12a)(eta$^6$-7,8,9,10,10a,6a)chrysene]bis(eta$^6$ -benzene)Cr$_2$(2+)[SbF$_6$(1−)]$_2$, (CO)$_2$bis[(diphenylphosphino)ethane]Cp$_2$Fe$_2$(2+)[PF$_6$(1−)]$_2$, [(eta$^6$-4,5,5a,28c,28b,3a)(eta$^6$-8a,8b,20d,22a,22b,24c)1H, 14H-dipyrano(3,4,5-gh:3',4',5'-g'h')anthra(2'',1'',9'':4,5,6; 6'',5'',10'':4',5'6')diisoquino(2,1-a:2',1'-a)dipyrimidine]Cp$_2$Fe$_2$(2+)[SbF$_6$(1−)]$_2$, [(eta$^6$-1,2,3, 3a,16c,16b)(eta$^6$-9,10,11,11a,13c,8b)cycloocta( 1,2,3,4-def:5,6,7,8-d'e'f')diphenanthrene]bis(eta$^5$-acetyl cyclopentadienyl)Fe(2+)[BF$_4$(1−)]$_2$; and other organometallic compounds such as (MeCp)Mn(CO)$_3$, CpMn(CO)$_3$, CpFe(CO)$_2$Cl, [(p-cymene)RuCl$_2$]$_2$, (eta$^6$-benzene)Cr(CO)$_3$, Re(CO)$_5$Br, Cp$_2$Fe, Cp$_2$TiCl$_2$; wherein:

Me is methyl;

Ph is phenyl;

Cp is eta$^5$-cyclopentadienyl;

Cp* is eta$^5$-pentamethylcyclopentadienyl;

MeCp is eta$^5$-methylcyclopentadienyl; and

Me$_3$SiCp is eta$^5$-trimethylsilylcyclopentadienyl.

It is within the scope of the present invention that a single catalyst precursor or mixtures of catalyst precursors can be used.

The preferred class of catalyst precursors used in the present invention is of formula (I), wherein M is iron. A more preferred class of catalyst precursors used in the present invention is of formula (I), wherein M is iron and L$^1$ is eta$^5$-cyclopentadienyl. The most preferred catalyst precursor used in the present invention is CpFe(CO)$_2$Cl.

The azide-containing materials utilizing the catalyst precursors of the present invention may be used in a variety of applications where the decomposition of the azide-containing material is desired. The azide-containing materials of the present invention may be used in the preparation of materials such as ablative imaging materials, propellants, gas generating films, blowing agents, and foams for a variety of applications.

The thermal decomposition of the azide-containing materials of the present invention may be brought about by any of the applicable heating methods used in the art. The preferred method of heating will depend on the particular application. For example in imaging applications, either resistive or radiative heat sources are commonly used. For ablative imaging constructions, a laser is a preferred heat source. An infrared laser or a flash lamp are particularly preferred heat sources.

The following non-limiting examples illustrate the present invention.

EXAMPLES

AD-5-BAMO Preparation

BAMO (poly[bis(azidomethyl)oxetane]) was obtained from the Aerojet Corp. The material had a molecular weight (MW) of about 4500 as determined by GPC. A suspension of 5 g of BAMO in 45 g of methyl ethyl ketone (MEK) was warmed to approximately 60° C. until the polymer dissolved and then 250 mg of acetylene dicarboxylic acid was added. The resulting solution was heated in a sealed jar at 60° C. for 3 hrs. and then cooled to room temperature before use. NMR analysis indicated the reaction of the alkyne to form the substituted-triazole.

AD-10-BAMO Preparation

AD-10-BAMO was prepared similarly to the AD-5-BAMO. Acetylene dicarboxylic acid (1.0 g) was added to a solution of 40 g MEK and 9.0 g BAMO and heated to 50°

C. for 10 hours. This material was either used in the MEK solution or it was prepared in an aqueous solvent. A 33.3 g portion of the MEK solution was concentrated on a rotary evaporator to give a viscous semi-solid (less than 3% residual solvent), and redissolved in a mixture of 1.8 g ethanolamine, 44 g isopropyl alcohol, and 88 g water at 40° C.

GAP-triol

"GAP" is an acronym for a glycidyl azide polymer. "GAP-triol" refers to a triol-terminated GAP polymer made according to the procedure disclosed in U.S. Pat. No. 4,962,213, incorporated herein by reference, and having a molecular weight of about 3,500 and a polydispersity index of less than 2.5.

Organometallic Compounds

Many of the organometallic compounds useful in the present invention are available from commercial sources such as Strem Chemical Company (Newburyport, Mass.) or Alfa (Johnson Matthey Catalog Company, Inc., Ward Hill, Mass.). Those that are not commercially available can be prepared by literature methods known to those skilled in the art; see, for example, *Dictionary of Organometallic Compounds*, Chapman and Hall, London, 1984, *Comprehensive Organometallic Chemistry*, Pergamon Press, Oxford, 1982, or *Comprehensive Coordination Chemistry*, Pergamon Press, 1984. U.S. Pat. No. 5,191,101 describes the preparation of organometallic complex salts useful in the present invention.

2,2-bis(ethylferrocenyl)propane is available from Strem Chemical Company (Newburyport, Mass.) and also as Catocene™ combustion catalyst (Syntex Corporation, Boulder, Colo.).

Examples 1, C1, and C2

Examples 1, C1, and C2 utilize Thermal Gravimetric Analysis (TGA) to compare energetic decomposition of compositions using the catalyst precursor of the present invention with compositions using known catalysts. All amounts are percent by weight unless otherwise noted.

A stock solution of 25% AD-10-BAMO in MEK was used in the preparation of the following test samples. The compositions are described below in Table 1.

TABLE 1

Test Samples for TGA

| Composition | Catalyst | Weight of Catalyst | Weight of AD-10-BAMO Solution |
|---|---|---|---|
| 1 | $CpFe(CO)_2Cl$ | 0.0129 g | 1.02 g |
| C1 | None | — | 1.00 g |
| C2 | 2,2-Bis(ethyl-ferrocenyl)propane | 0.0122 g | 1.01 g |

Approximately 0.9 g of each of the above samples was placed on a piece of silicon release liner, allowed to air dry for about one hour, and then dried in a vacuum oven at room temperature overnight. The TGA sample size was between 5 and 20 mg. A DuPont Instruments Model 951 Thermogravimetric Analyzer (Wilmington, Del.) was used to make the measurements. The TGA scans were run under nitrogen and the temperature ramp was 10° C./minute.

Figure 1:
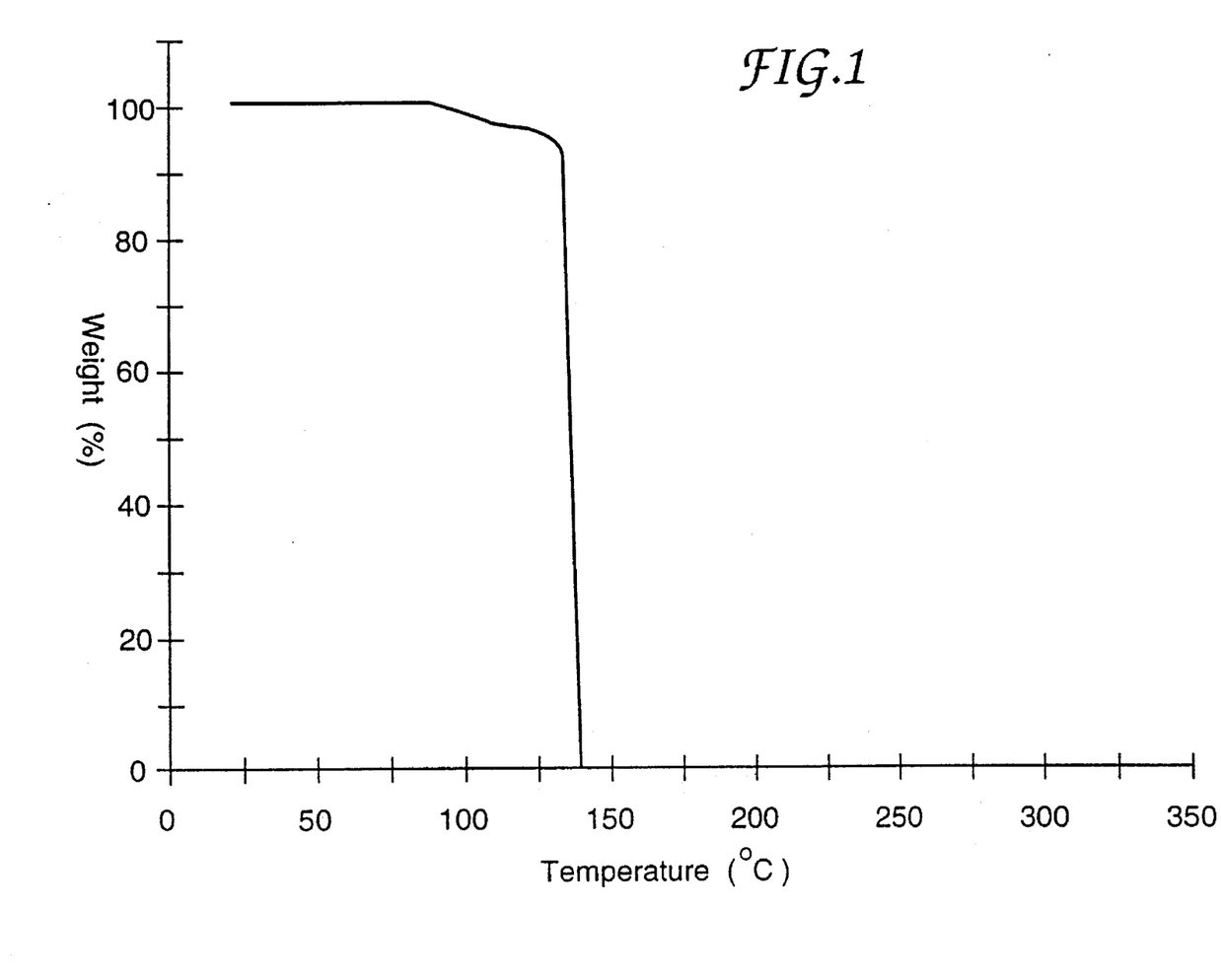
FIG. 1 is a Thermal Gravimetric Analysis (TGA) scan at 10° C./min. for an energetic polymer containing a catalyst precursor of this invention and shows a sharp decomposition at about 135° C.
Figure 2:
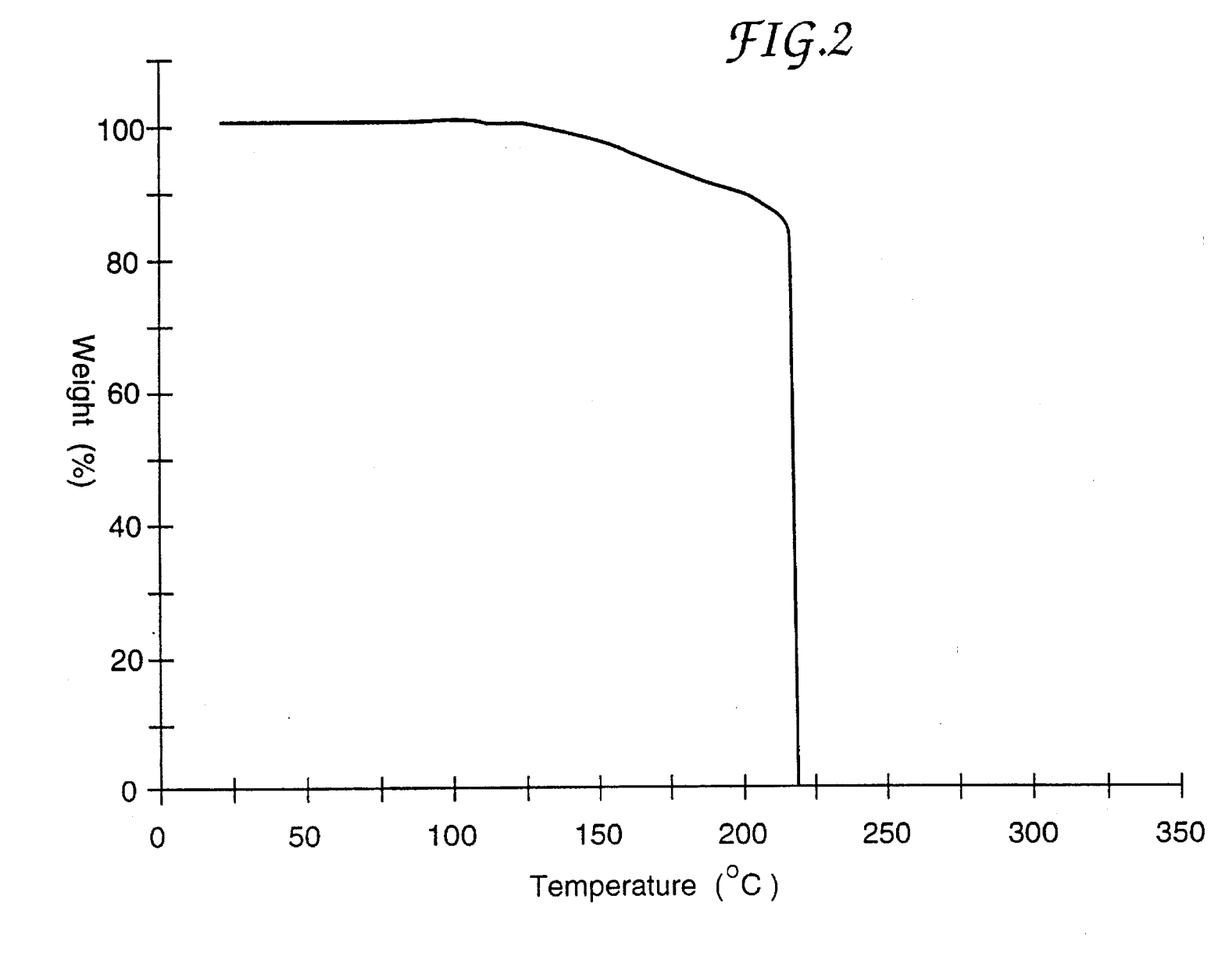
FIG. 2 is a TGA scan at 10° C./min. for a comparative example of energetic polymer containing no catalyst precursor and shows an abrupt decomposition at about 235° C.
Figure 3:
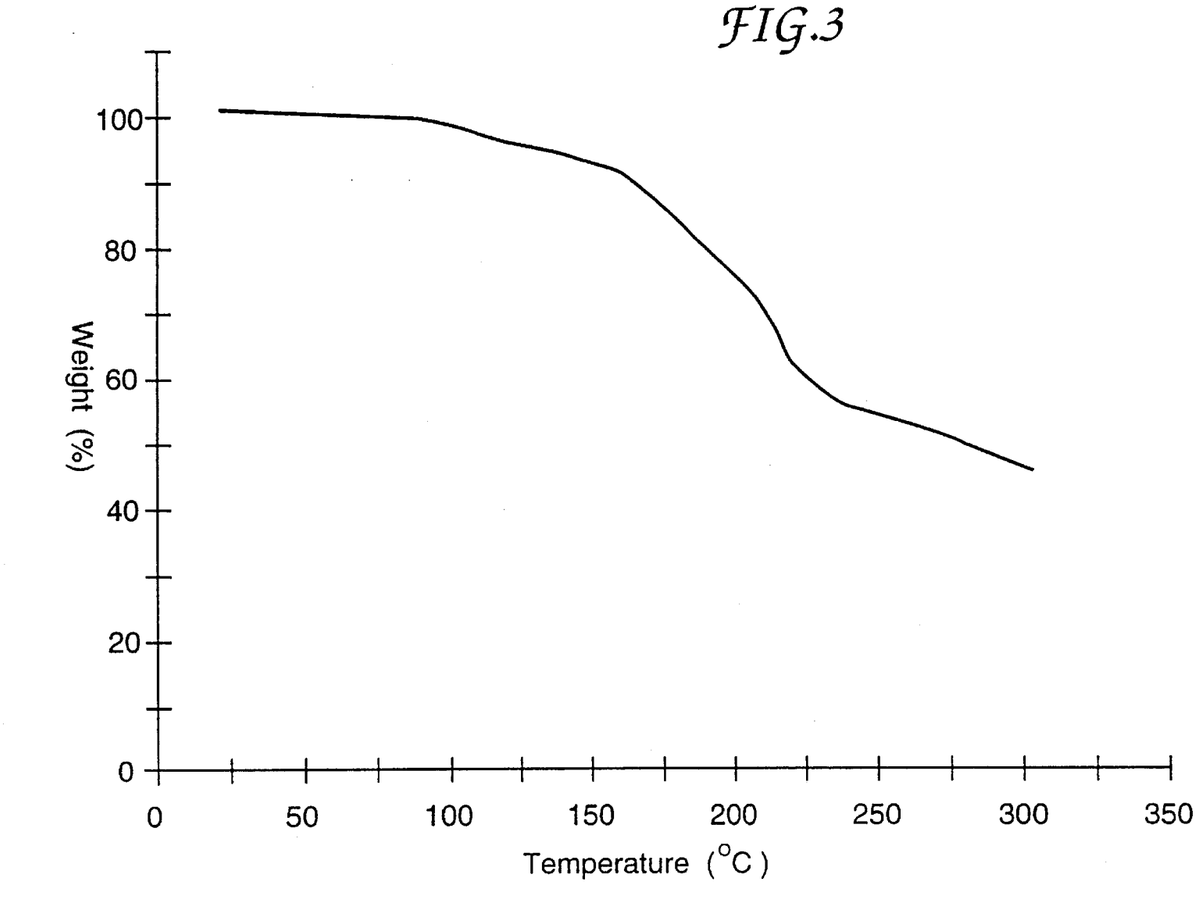
FIG. 3 TGA scan at 10° C./min. for a comparative example of energetic polymer containing a non-inventive catalyst precursor and shows a gradual decomposition over a broad range starting at about 100° C. and continuing beyond 300° C.

The TGA curves are show in FIGS. 1, 2 and 3. For sample C1, the decomposition is abrupt at about 235° C., while sample C2 shows a gradual decline over a broad range starting at about 100° C. and continuing beyond 300° C.

These results are in contrast to those for Example 1, which shows a sharp decomposition at about 135° C., almost 100° C. lower than C1 and much sharper and well defined than the gradual decline seen in C2. This sharp decomposition behavior is preferred for applications such as ablative thermal imaging.

Example 2

Various iron-containing organometallic compounds were tested as catalyst precursors at 5% w/w w.r.t AD-5-BAMO. The appropriate amount of each catalyst precursor was dissolved in a 10% w/w solution of AD-5-BAMO in methyl ethyl ketone, four drops of this solution were placed in a small open aluminum pan such as used in differential scanning calorimetry (DSC) as a sample pan, and the solvent was evaporated by placing the pan on a hot plate at 60° C. The pan was then transferred to the surface of a Dataplate® Series 730 Digital Hot Plate/Stirrer (PMC Industries, Inc., San Diego, Calif.) plate at 100° C. and the hot plate was programmed to heat to 350° C. at its maximum rate. Decomposition of the sample was detectable both visibly and audibly. Temperature was noted on the hot plate display. The results of the decomposition tests are summarized below in Table 2.

Prior to use, the solutions of catalyst precursors and AD-5-BAMO in methyl ethyl ketone were checked for free iron cations by mixing with an acetonitrile solution of 2,4,6-tri(2-pyridyl)-1,3,5-triazine (TPTZ). The absence of blue color was taken to be indicative of catalyst precursor quality/integrity. A blue color indicates a decomposed complex liberating iron to complex with the TPTZ. Heating of these TPTZ-catalyst precursor test solutions gave rise to an intense blue color, indicating the formation of an active catalytic species from a latent catalyst precursor.

TABLE 2

| Iron-Containing Organometallic | Decomposition Temperature (°C.) |
|---|---|
| none | 250–275 |
| $CpFe(CO)_2Br$ | darkening, no detonation |
| trifluoroacetylacetone iron (III) | 190–265 |
| $CpFe(xylenes)SbF_6$ | 259 |
| $CpFe(mesitylene)SbF_6$ | 250 |
| $CpFe(benzene)PF_6$ | 240 |
| $CpFe(xylenes)PF_6$ | 237 |
| $[CpFe(CO)_2]_2$ | 230 |
| $CpFe(xylenes)CF_3SO_3$ | 229 |
| $CpFe(toluene)PF_6$ | 226 |
| $CpFe(mesitylene)PF_6$ | 218 |
| $CpFe(toluene)SbF_6$ | 214 |
| $[CpFe(CO)_2PPh_3]CoCl_4$ | 210 |
| $[CpFe(CO)_2PPh_3]AsF_6$ | 208 |
| $[CpFe(CO)_2AsPh_3]AsF_6$ | 207 |
| $CpFe(mesitylene)BF_4$ | 204 |
| $[CpFe(CO)_2PPh_3]CuCl_4$ | 198 |
| $[CpFe(CO)_2PPh_3]BF_4$ | 195 |
| $[CpFe(CO)_2PPh_3]SnCl_6$ | 192 |
| $[CpFe(CO)_2SbPh_3]Cl$ | 188 |
| $[CpFe(CO)_2PPh_3]ZnCl_4$ | 188 |
| $[CpFe(CO)_2PPh_3]FeCl_4$ | 180 |
| $CpFe(CO)_2Cl$ | 140–145 |

The same test performed at 15% w/w $CpFe(CO)_2Cl$ w.r.t AD-5-BAMO revealed thermal decomposition of the azides at 105° C. (In this instance, the hot plate temperature was determined with an external thermocouple.) Also, a DSC (TA instruments Model 912 Differential Scanning Calorimeter using a scan rate of 10° C./min.) of $CpFe(CO)_2Cl$ showed a melting endotherm at 98° C. and a decomposition exotherm at 103° C.

Terephthaloylazide ($N_3CO$—p—$C_6H_4$—$CON_3$), which when tested alone with this hot plate method, decomposes vigorously at 130° C., does not, when mixed with AD-5-BAMO, affect the decomposition temperature of the alkyl azide-containing polymer. This result supports the fact that it is an iron species acting in a catalytic manner which decomposes the azides and not just an exothermic reaction of the iron-containing organometallic releasing enough energy to initiate azide decomposition.

Example 3

The procedure of Example 2 was repeated, only various organometallic compounds containing metals other than iron were used as catalyst precursors and methylene chloride was used as solvent. The results of the decomposition tests are summarized below in Table 3.

TABLE 3

| Organometallic Compound | Decomposition Temperature (°C.) |
|---|---|
| none | 250–275 |
| $(MeCp)Mn(CO)_3$ | 276 |
| $(MeCp)Mn(CO)_2(PPh_3)$ | 272 |
| $[CpRe(CO)_2(NO)]^+[BF_4]^-$ | 264 |
| $Mn(acac)_3$ | 280 |
| $[(MeCp)Mn(CO)_2(NO)]^+[PF_6]^-$ | 275 |
| $(CO)_5ReBr$ | 263 |
| $V(acac)_3$ | 272 |
| $Rh_6(CO)_{16}$ | 283 |
| $[(n-Bu)_4N]^+[Rh(CO)_2Cl_2]^-$ | 275 |
| $(CO)_2Co(PPh_3)(NO)$ | 218 |
| $Fe_2Ru(CO)_{12}$ | 269 |
| $Cp_2Ru$ | 277 |
| $(PhCN)_2PdCl_2$ | 262 |
| $CpPtMe_3$ | 262 |
| $O[(CH(CH_3)Cp)Mn(CO)_3]_2$ | 281 |
| $(CO)_3Co$—C(Ph)—C(Ph)—$Co(CO)_3$ tetrahedrane | 220 |

(Comparative) Example 4

Additional screening of other organometallic catalyst precursor compounds for potential catalytic activity in the decomposition of energetic azide-containing polymers was performed as follows:

15 mg of the following organometallic compounds tested in Table 4 were added to 1.0 g of 30% by weight solution of AD-5-BAMO in methylene chloride (approximately 0.3 g AD-5-BAMO, therefore 5% by weight organometallic). Two drops of each mixture were placed into an open DSC pan and each pan was heated for 2 min. at 100° C. on a hot plate. The samples were then transferred to a hot plate at 150° C. and the temperature was immediately increased at the fastest rate the hot plate would heat.

TABLE 4

COMPARATIVE EXAMPLES

| Compound | Solubility | Decomposition Temperature |
|---|---|---|
| none | — | 284° C. |
| dipotassium decaboranedecahydride | incomplete | 275° C. |
| ferrocene | complete | 254° |
| 2,2-bis(ethylferrocenyl)propane | complete | 252° C. |
| 1,1'-ferrocenedicarboxylic acid | incomplete | 232° C. |
| ferrocenecarboxylic acid | incomplete | 220° C. |
| N,N-dimethylaminomethyl-ferrocene methiodide salt | complete | 220° C. |

None of these samples approached the far lower decomposition temperature of $CpFe(CO)_2Cl$. The reported decomposition temperature of ferrocenecarboxylic acid is 210° C., which, when coupled with the decomposition temperature it produces when mixed with the energetic polymer, is in accord with previous mechanistic suggestions (decomposition of the organometallic produces an active Lewis-acidic, iron-containing species which catalyzes azide decomposition). The N,N-dimethylaminomethyl-ferrocene methiodide salt, ferrocenecarboxylic acid, and 1,1'-ferrocenedicarboxylic acid samples exhibited pronounced darkening at 90° C. No unusual colors were observed for the borane-containing sample during the experiment.

(Comparative) Example 5

10 mg of the compounds listed in Table 5 were added to 1.0 g of a 13% by weight solution of AD-10-BAMO in 1:2 isopropanol:$H_2O$ neutralized with ethanolamine (approximately 0.13 g AD-10-BAMO, therefore 7.7% by weight organometallic.) Four drops of each mixture were placed into an open DSC pan and each pan was heated for 2 min. at 100° C. on a hot plate. The samples were then transferred to a hot plate at 150° C., heated at 150° C. for 2 min., and then the temperature was immediately increased at the fastest rate the hot plate would heat.

TABLE 5

COMPARATIVE EXAMPLES

| Compound | Solubility | Decomposition Temperature |
|---|---|---|
| none | — | 284° C. |
| dipotassium decaboranedecahydride | complete | 284° C. |
| ferrocene | incomplete | 255° C. |
| 2,2-bis(ethylferrocenyl)propane | incomplete | 252° C. |
| 1,1'-ferrocenedicarboxylic acid | incomplete | 229° C. |
| N,N-dimethylaminomethyl-ferrocene methiodide salt | complete | 220° C. |
| ferrocenecarboxylic acid | incomplete | 216° C. |

Both the magnitude and ordering of the catalytic effects provided by these materials in an aqueous medium are on a par with those seen when an organic medium is used. All the samples left a black residue after decomposition (unlike those from the organic medium tests). The N,N-dimethylaminomethylferrocene methiodide salt, ferrocenecarboxylic acid, and 1,1'-ferrocenedicarboxylic acid samples exhibited pronounced darkening at ~190° C. and no unusual colors were observed for the borane-containing sample during the experiment.

Example 6

Further evidence for the catalytic effect of the organo-iron complexes is shown by the effect of the CpFe(CO)$_2$Cl material on the response of azides to shock waves at elevated temperatures. A test procedure was developed to subject samples to shock waves at controlled elevated temperatures. Iron assemblies typically used to evaluate the response to shock waves of explosives were made with a relatively large thermal mass. These consisted of a large holder, with an anvil, hammer, plunger, and thermocouple. The thermocouple was threaded into the area immediately adjacent to the sample and monitored. The assembly was put into an oven and its temperature was allowed to stabilize as measured with the thermocouple. The sample was loaded on the anvil (typically as a 20% solution in MEK which immediately evaporated) and the hammer and plunger were added. The assembly was placed under suspended 10 lb. weight, the temperature was noted, and the weight was then dropped vertically on a rail (usually 24") directly onto the plunger. The area of the sample was a circle of radius 0.1", area 0.031 in$^2$. After each drop, the device was disassembled, evidence for decomposition (such as odor and change in visual appearance) was noted, and the device was cleaned with acetone. The experiment was repeated as noted in Table 6.

TABLE 6

| Sample | 75° C. | 100° C. | 117° C. | 130° C. |
|---|---|---|---|---|
| GAP | | | no | |
| GAP + 5% catalyst | no | yes | | |
| BAMO | | | | no (10" drop) |
| BAMO + 5% catalyst | | slight | | |
| GAP + BAMO + 5% catalyst | | very slight | | |

"catalyst" used was CpFe(CO)$_2$Cl.

"no" indicates no evidence for decomposition.

"yes" means that there was a noticeable odor and visual decomposition of the sample after the drop and disassembly.

"slight" means that there was only a slight odor and the visual decomposition did not cover all of the area of the anvil.

"very slight" means that there was no noticeable odor, and there was only a small area of decomposition noted on the sample.

Reasonable modifications and variations are possible from the foregoing disclosure without departing from either the spirit or scope of the present invention as defined by the claims.

What is claimed is:

1. A material comprising:
   (a) at least one polymer which contains at least about 25 wt % azide groups; and
   (b) at least one catalyst precursor which is an organometallic complex which upon thermolysis liberates at least one coordination site, thereby generating a catalyst for the thermal decomposition of said polymer, said catalyst precursor having the formula:

$[L^1L^2L^3M]^{+e}X_f$ wherein:
   $L^1$ represents none or 1 to 12 ligands contributing pi-electrons that can be the same or different selected from: substituted and unsubstituted acrylic and cyclic unsaturated compounds and groups and substituted and unsubstituted carbocyclic aromatic and heterocyclic aromatic compounds, each contributing 2 to 6 pi-electrons to the valence shell of M;
   $L^2$ represents none or 1 to 24 ligands that can be the same or different, contributing an even number of sigma-electrons, selected from: mono-, di-, and tridentate ligands, each donating 2, 4, or 6 sigma-electrons to the valence shell of M;
   $L^3$ represents none or 1 to 12 ligands that can be the same or different, each contributing no more than one sigma-electron each to the valence shell of each M;
   M represents 1 to 4 of the same or different metal atoms selected from the elements of periodic Groups IVB, VB, VIB, VIIB, and VIII;
   e is an integer having a value of 0, 1, or 2, such that the organometallic portion of the molecule is neutral, cationic, or dicationic;
   X is an anion selected from organic sulfonate and halogenated metal or metalloid groups; and
   f is an integer having a value of 0, 1, or 2, the number of anions required to balance the charge e on the organometallic complex;
with the proviso that (i) the organometallic complex contains at least one metal-carbon bond; (ii) $L^1$, $L^2$, $L^3$, M, e, X, and f are chosen so as to achieve a stable electronic configuration; and (iii) if M is Fe, e is 0, and $L^1$ is two substituted or unsubstituted cyclopentadienyl ligands, then one of $L^2$ or $L^3$ must be present.

2. The material according to claim 1 wherein said polymer contains at least about 35 wt % azide groups.

3. The material according to claim 2 wherein said polymer contains at least about 40 wt % azide groups.

4. The material according to claim 1 wherein said polymer has the following formula:

wherein:
   Y represents a hydroxyl, azide, carboxyl, mercapto, or amino group;
   R represents a divalent monomer group, containing a N$_3$ group, derived from a cyclic ether; a cyclic sulfide; and a cyclic amine;
   L represents a mono-, di-, tri- or tetra-valent alkyl radical; corresponding to L, m represents 1, 2, 3, or 4; and
   n represents any positive integer greater than 1.

5. The material according to claim 1 wherein said polymer comprises recurring units of the formula:

wherein:
   $R^3$ and $R^4$ each independently represent an azide-containing group.

6. The material according to claim 1 wherein said polymer is present in an amount in the range of from about 5 to 99.9 weight percent of said material.

7. The material according to claim 1 wherein M is selected from the group consisting of Fe, Re, Co, Ru, Mn, Rh, V, Pt, and Pd.

8. The material according to claim 1 wherein $L^1$ of said organometallic complex contains up to 24 carbon and up to two hetero atoms selected from nitrogen, oxygen, and sulfur.

9. The material according to claim 1 wherein $L^2$ of said organometallic complex is selected from CO, $PPh_3$, $AsPh_3$, and $SbPh_3$.

10. The material according to claim 1 wherein said catalyst precursor is $CpFe(CO)_2Cl$.

11. The material according to claim 1 wherein said catalyst precursor is present in an amount in the range of from about 0.1 to 40 weight percent of said material.

12. The material according to claim 11 wherein said catalyst precursor is present in an amount in the range of from about 1 to 10 weight percent of said material.

* * * * *